United States Patent
Wong

(10) Patent No.: US 10,588,438 B2
(45) Date of Patent: Mar. 17, 2020

(54) FLUID DISPENSER WITH REFLUX MECHANISM

(71) Applicant: KING'S FLAIR MARKETING LIMITED, Road Town, Tortola (VG)

(72) Inventor: Siu Wah Wong, Tsuen Wan (HK)

(73) Assignee: KING'S FLAIR MARKETING LIMITED, Road Town, Tortola (VG)

( * ) Notice: Subject to any disclaimer, the term of this patent is extended or adjusted under 35 U.S.C. 154(b) by 37 days.

(21) Appl. No.: 15/778,826

(22) PCT Filed: Nov. 24, 2016

(86) PCT No.: PCT/CN2016/107108
§ 371 (c)(1),
(2) Date: May 24, 2018

(87) PCT Pub. No.: WO2017/088793
PCT Pub. Date: Jun. 1, 2017

(65) Prior Publication Data
US 2018/0344063 A1      Dec. 6, 2018

Related U.S. Application Data

(60) Provisional application No. 62/259,876, filed on Nov. 25, 2015.

(51) Int. Cl.
*A47G 19/18* (2006.01)
*G01F 11/02* (2006.01)

(52) U.S. Cl.
CPC .......... *A47G 19/183* (2013.01); *G01F 11/028* (2013.01)

(58) Field of Classification Search
CPC ............................ A47G 19/183; G01F 11/028
USPC ........................................ 222/109–110, 205
See application file for complete search history.

(56) References Cited

U.S. PATENT DOCUMENTS

| | | | | |
|---|---|---|---|---|
| 1,682,363 A | * | 8/1928 | Austin | G01F 13/00 |
| | | | | 222/385 |
| 3,193,149 A | * | 7/1965 | Beaubien | F04B 53/122 |
| | | | | 222/109 |
| 3,203,454 A | * | 8/1965 | Micallef | B65D 83/28 |
| | | | | 141/113 |
| 10,059,491 B2 | * | 8/2018 | Wong | B65D 47/0857 |
| 2010/0213211 A1 | * | 8/2010 | Whaling | B65D 41/56 |
| | | | | 222/111 |
| 2011/0079613 A1 | * | 4/2011 | Chih | G01F 11/028 |
| | | | | 222/158 |
| 2015/0090738 A1 | * | 4/2015 | Caporale | B67D 7/0288 |
| | | | | 222/205 |

* cited by examiner

*Primary Examiner* — Frederick C Nicolas
*Assistant Examiner* — Randall A Gruby
(74) *Attorney, Agent, or Firm* — Browdy and Neimark, P.L.L.C.

(57) ABSTRACT

A fluid dispenser is provided. The fluid dispenser (1) having a dispensing mechanism (9) for pumping fluid, such as cooking oil, from a storing compartment (2) into a metering compartment (3), and a reflux mechanism (10) for allowing the fluid pumped into the metering compartment (3) to flow back into the storing compartment (2), such that accurate metering of fluid can be achieved.

23 Claims, 17 Drawing Sheets

FLUID DISPENSER WITH REFLUX MECHANISM

TECHNICAL FIELD OF THE INVENTION

This invention relates generally to a fluid dispenser, and particularly, to a fluid dispenser comprising a dispensing mechanism for metering fluid such as cooking oil.

BACKGROUND OF THE INVENTION

Fluid dispensers for use in kitchens for storage and dispensing of fluid sources, such as vinegar, soybean source, or cooking oils, such as peanut oil, olive oil, soybean oil, etc., are frequently used in the kitchens. As people are becoming more and more concerned about health problems related to the excessive consumption of the sources and the cooking oils, the dispensers with a metering function are becoming more and more popular. This kind of "metering fluid dispenser" typically comprises a storing compartment for containing and storing the fluid, and a metering compartment on top of the storing compartment for metering a certain volume of the fluid to be dispensed. To facilitate the metering, the metering compartment is usually made to be at least partially transparent, and graduations are usually provided on the wall of the metering compartment. A pump, either manually driven or electrically actuated, is usually provided to pump the fluid from the storing compartment into the metering compartment.

In the operation of such a metering fluid dispenser, the user pumps the fluid from the storing compartment into the metering compartment, by pressing a button for example, until the desired volume of the fluid has been pumped into the metering compartment. Then the fluid that has been pumped into the metering compartment can be poured out of the metering compartment through a nozzle thereof for use in cooking food, for example.

A problem associated with this kind of metering fluid dispenser is that the fluid can only be pumped from the storing compartment into the metering compartment, but not the other way around. In other words, the fluid is not allowed to flow back into the storing compartment. Therefore, if a larger volume of fluid than desired is accidentally pumped into the metering compartment, the excessive amount of the fluid needs to be poured out of the metering compartment and be discarded, resulting in waste of fluid and inconvenience in the operation of the fluid bottle.

SUMMARY OF THE INVENTION

In order to solve the above problem, it is the principle aim of the present invention to provide a fluid dispenser with a reflux mechanism, which allows excessive fluid, such as vinegar or soybean source or cooking oil, that has been dispensed into the metering compartment to flow back into the storing compartment, facilitating metering of the fluid and preventing waste of the fluid. More particularly, the invention aims to provide a fluid dispenser comprising fluid dispensing means and fluid reflux means for allowing the excess amount of dispensed fluid to return into the storing compartment.

These and other objects are satisfied by the present invention, which provides a fluid dispenser for containing fluid and dispensing a metered amount of the fluid, comprising:

a storing compartment for storing the fluid and having a top opening, a metering compartment placed over and covering the top opening of the storing compartment, a dispensing mechanism extending into the storing compartment and able to draw an amount of the fluid from the storing compartment and discharge the amount of the fluid into the metering compartment, and a reflux mechanism which, when actuated, allows the fluid discharged into the metering compartment to flow back into the storing compartment.

In one embodiment of the present invention, the dispensing mechanism is a pumping mechanism configured as a push-actuated pump extending through a bottom plate of the metering compartment to pump fluid from the storing compartment into the metering compartment when pressed downwardly.

In one embodiment of the present invention, the dispensing mechanism comprises:

a housing, a plunger having a lower portion movable within the housing to draw and discharge the fluid, an upper portion extending beyond a top of the housing, and a discharge passage formed therein for discharging the fluid from the housing into the metering compartment a pumping spring accommodated in the housing and configured to constantly apply an upward force to the plunger, a one-way valve arranged at a bottom of the housing and configured to allow for only upward flow of the fluid therethrough into the housing.

In one embodiment of the present invention, the fluid dispenser further comprises a pumping actuator coupled with the upper portion of the plunger and movable to actuate the dispensing mechanism.

In one embodiment of the present invention, the dispensing mechanism further comprises an aspirating tube connected to the one-way valve and in fluid communication with the storing compartment.

In one embodiment of the present invention, the plunger is arranged such that the lower portion of the plunger forms a sealing contact with an inner wall of the housing.

In one embodiment of the present invention, a window for the dispensing mechanism to extend therethrough and a reflux aperture are formed through a bottom plate of the metering compartment, wherein the reflux aperture is operably blocked by the reflux mechanism when the reflux mechanism is not activated, and is exposed to allow the fluid to return from the metering compartment into the storing compartment when the reflux mechanism is actuated.

In one embodiment of the present invention, the reflux mechanism comprises:

a blocking member adapted for operably blocking the reflux aperture, a lever member pivotally mounted on the metering compartment to cause the blocking member to block or expose the reflux aperture, and a reflux actuator in operative connection with lever member for actuating pivotal movement of the lever member.

In one embodiment of the present invention, the reflux mechanism further comprises a linkage arranged between the reflux actuator and a first end portion of the lever member for transmitting downward movement of the reflux actuator to the first end portion of the lever member, and the lever member has a second end portion opposite to the first end portion coupled with the blocking member, and wherein the reflux actuator is actuated to move the second end portion upwardly to lift the blocking member from the reflux aperture.

In one embodiment of the present invention, the lever member comprises a center hole formed therethrough for the dispensing mechanism to extend through, and a pair of mounting pins extending outwardly from opposite sides of the center hole for pivotally mounting the lever member to the metering compartment.

In one embodiment of the present invention, the metering compartment comprises a top plate having a center orifice for the pumping actuator to movably extend through, and having a first side orifice for a first stub extending downwardly from a bottom surface of the reflux actuator to movably extend therethrough to press against the linkage.

In one embodiment of the present invention, a pair of mounting piers extend upwardly from the bottom plate of the metering compartment on opposite sides of the window, each of the mounting piers having a mounting hole formed therein, and the pair of mounting pins of the lever member are pivotally inserted into the pair of mounting holes, respectively, such that the lever member is pivotally mounted on the pair of mounting piers.

In one embodiment of the present invention, the blocking member is fixedly connected to the second end portion of the lever member and is positioned right above the reflux aperture.

In one embodiment of the present invention, a post extends upwardly from the bottom plate of the metering compartment through a side hole formed in the first end portion of the lever member, and a first spring is held on the post between the bottom plate of the metering compartment and the lever member, and is configured to constantly apply an upward force to the first end portion of the lever member.

In one embodiment of the present invention, the linkage has a top open end for receiving a stub extending downwardly from a bottom surface of the reflux actuator, and a bottom open end for receiving a top end portion of the post which extends beyond the lever member through the side hole.

In one embodiment of the present invention, a pair of U-shaped mounting members are formed on an inner wall of the metering compartment below the bottom plate and positioned to correspond to the pair of mounting pins of the lever member for pivotal insertion of the pair of mounting pins into the pair of U-shaped mounting members, respectively.

In one embodiment of the present invention, a first sleeve extends downwardly from the first side orifice, and a shoulder is formed within the first sleeve, wherein a first spring is held on the first stub received in the first sleeve and between the shoulder and the bottom surface of the reflux actuator to constantly apply an upward force to the reflux actuator.

In one embodiment of the present invention, a second side orifice and a third side orifice are formed in the top plate on opposite sides of the first side orifice, and a second sleeve and a third sleeve extend downwardly from the second side orifice and the third side orifice, respectively, to movably receive a second stub and a third stub extending downwardly from the bottom surface of the reflux actuator, respectively.

In one embodiment of the present invention, the reflux mechanism further comprises a linking pin which is fixedly connected to the blocking member, and which movably extends through the reflux aperture, such that when the reflux mechanism is actuated, the second end portion of the lever member moves upwardly to push a lower end of the linking pin to lift the blocking member from the reflux aperture.

In one embodiment of the present invention, a mounting sleeve is aligned with the reflux aperture and is fixedly attached to a lower surface of the bottom plate of the metering compartment, wherein the linking pin on which the second spring is held is movable within the mounting sleeve thereby to constantly apply a downward force to an enlarged-diameter lower end portion of the linking pin, such that when the reflux mechanism is not actuated, the blocking member is biased to cover and block the reflux aperture.

DETAILED DESCRIPTION OF THE INVENTION

While this invention is illustrated and described in preferred embodiments, the fluid dispenser of the present invention may be produced in many different configurations, sizes, forms and materials.

Figure 1:
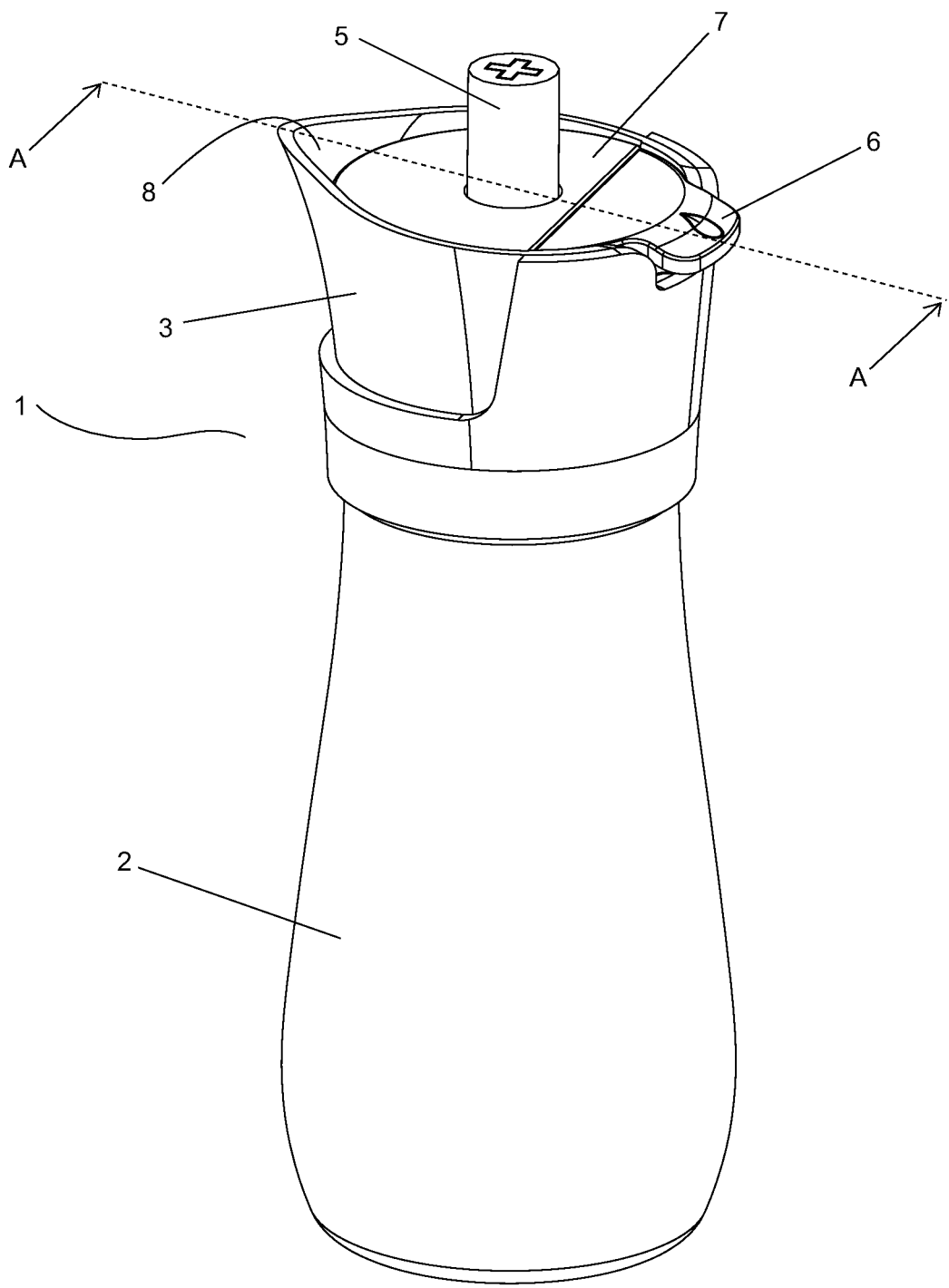
FIG. 1 is a perspective view of the fluid dispenser with a reflux mechanism according to a first embodiment of the present invention.
Figure 2:
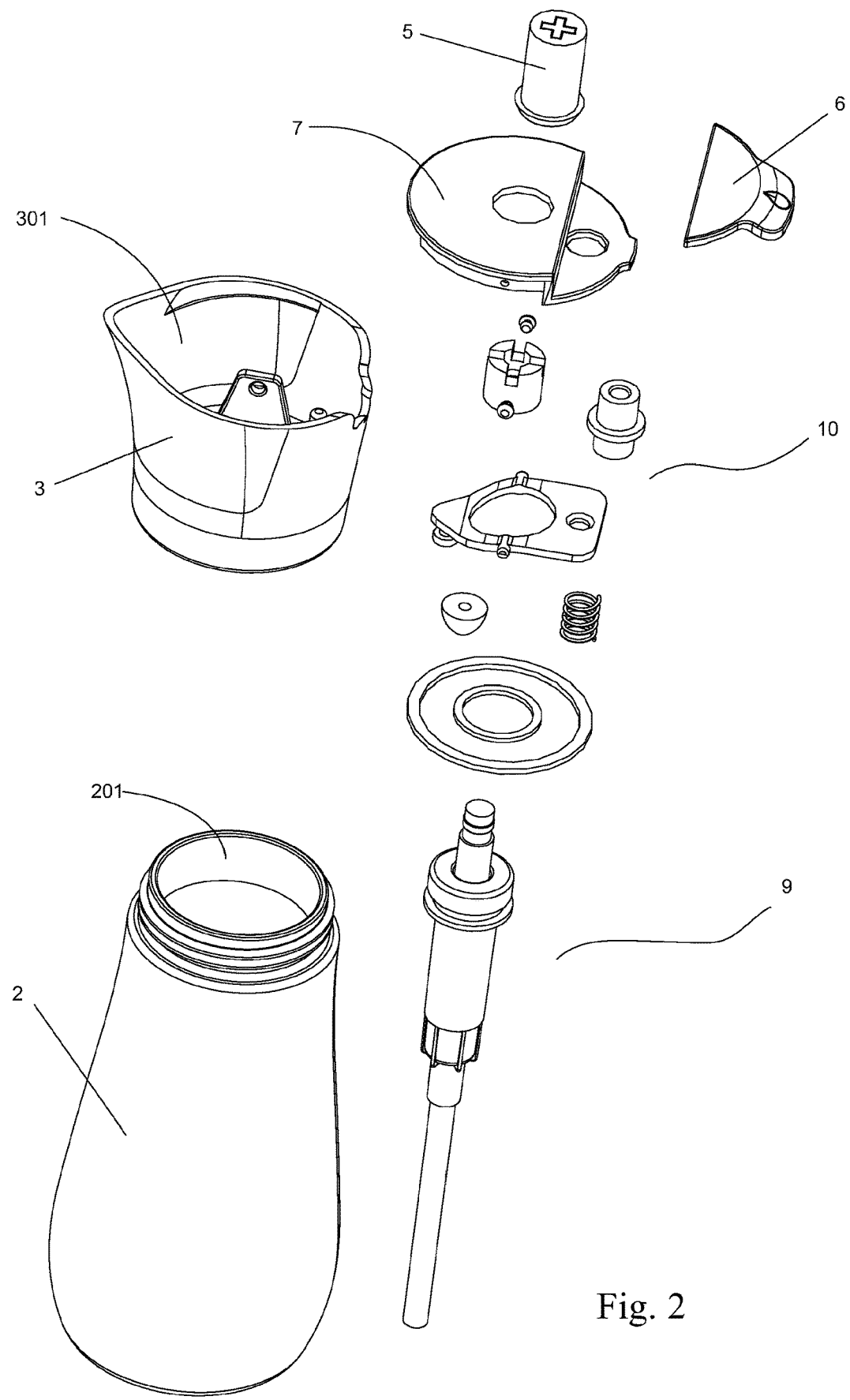
FIG. 2 is an exploded perspective view of the fluid dispenser with a reflux mechanism shown in FIG. 1.

Referring now to the drawings, as shown in FIGS. 1 and 2, according to a first embodiment of the present invention, the fluid dispenser 1 with a reflux mechanism comprises a lower storing compartment 2 and an upper metering compartment 3. The storing compartment 2 has a top opening 201, and the metering compartment 3 is placed over the storing compartment 2, covering the opening 201. The metering compartment 3 also has a top opening 301, which is partially covered by a top plate 7, defining a pouring outlet 8. A pumping actuator 5 is provided extending beyond the top plate 7. The function of the pumping actuator 5 is to actuate, when pressed downwardly, a dispensing mechanism 9 to displace a predetermined amount of the fluid (such as cooking oil) contained in the storing compartment 2 into the metering compartment 3. Also provided on the top plate 7 is a reflux actuator 6, which serves, when pressed downwardly, to actuate a reflux mechanism 10 which allows the fluid that has been pumped into the metering compartment 3 to flow back into the storing compartment 2. Details of the dispensing mechanism 9 and the reflux mechanism 10 will be described in the following.

Figure 3:
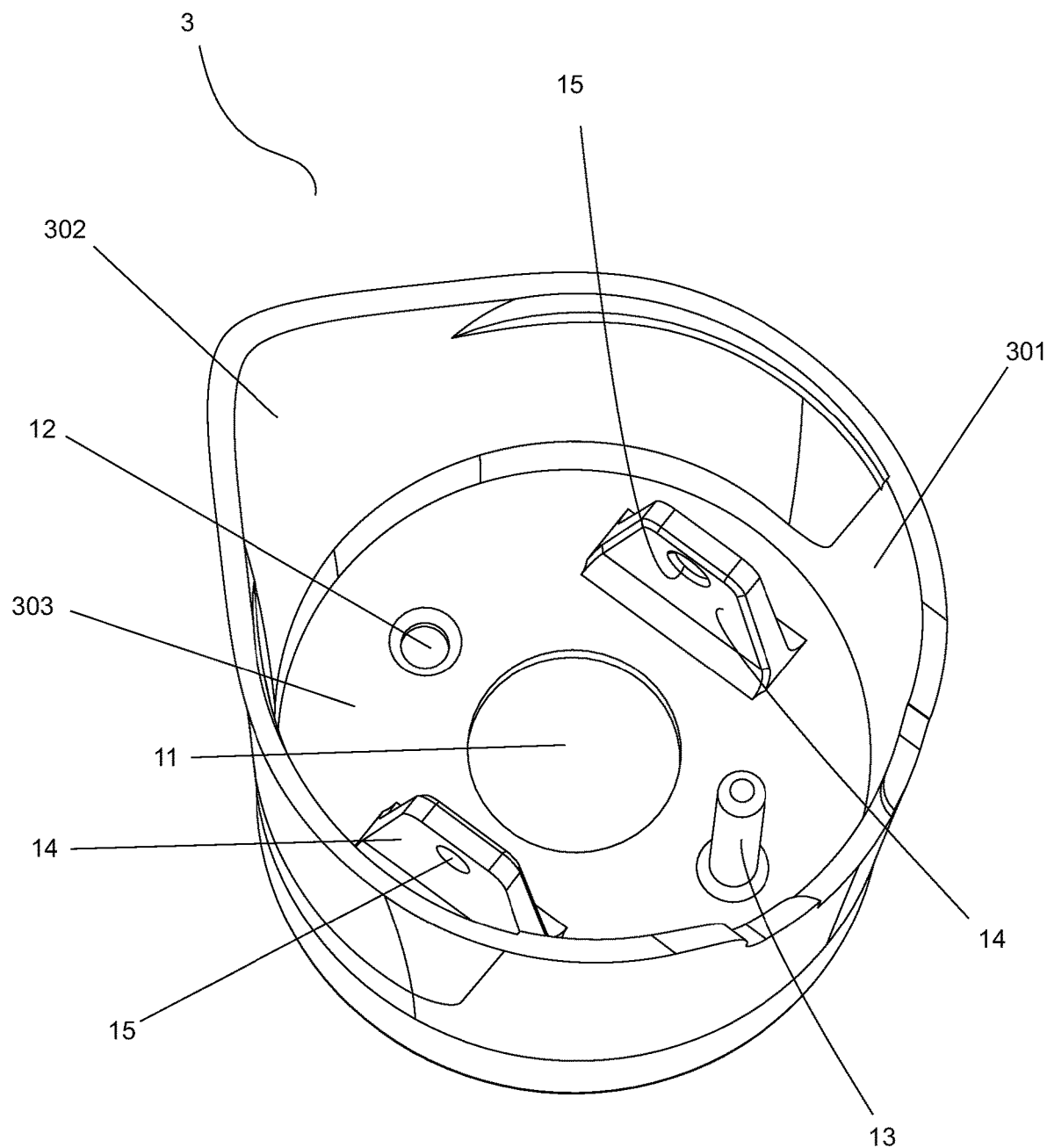
FIG. 3 is a top perspective view of the metering compartment of the fluid dispenser shown in FIG. 1.

FIG. 3 shows a top perspective view of the metering compartment 3, which is substantially of the shape of a bucket with a top opening 301. To facilitate the pouring of oil, a pouring trough 302 is formed on a wall of the metering compartment 3 and extends from a bottom plate 303 of the metering compartment 3 to the pouring outlet 8. A pumping aperture 11 is formed in a center of the bottom plate 303 of the metering compartment 3 for the dispensing mechanism 9 to extend through. A reflux aperture 12 with a diameter much smaller than that of the pumping aperture is formed on the bottom plate 303 of the metering compartment 3 as well. Preferably, the reflux aperture 12 is formed on a side of the pumping aperture 11 that is approximate to the pouring trough 302. On a side of the pumping aperture 11 opposite to the reflux aperture 12 is a post 13 extending upwardly from the bottom plate 303 of the metering compartment 3. In addition, a pair of mounting piers 14 are formed on opposite sides of the pumping aperture 11. In other words, the reflux aperture 12, one of the mounting piers 14, the post 13 and the other of the mounting piers 14 are evenly and sequentially arranged around the pumping aperture 11 with an interval angle of about 90 degrees. A mounting hole 15 is drilled on each of the mounting piers 14 proximate to a top end thereof.

Figure 4:
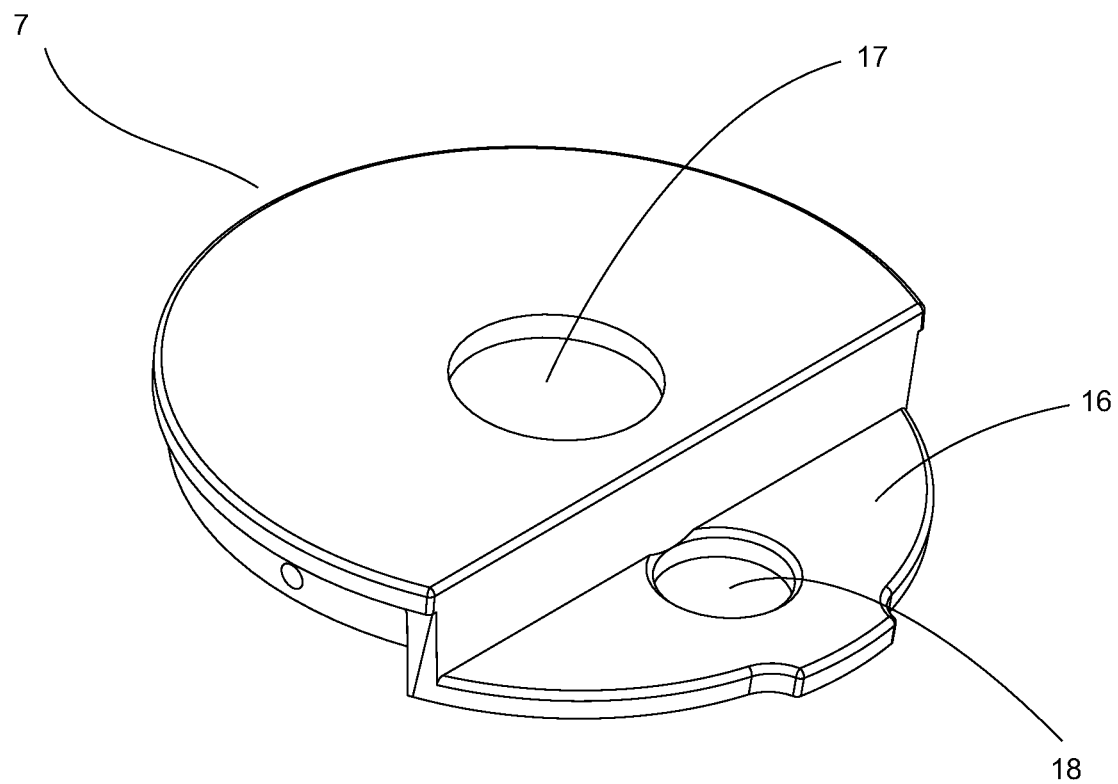
FIG. 4 is a top perspective view of the top plate of the fluid dispenser shown in FIG. 1.

As shown in FIG. 4, the top plate 7 is substantially of a round shape, with a step 16 formed thereon at a side opposite to the pouring outlet 8. A center orifice 17 is formed at a center of the top plate 7 for the pumping actuator 5 to movably extend through, and a side orifice 18 is formed on the step 16 for a linkage 19 of the reflux mechanism 10 to movably extend through. The reflux actuator 6 is placed on the step 16, such that the dispenser has a substantially flush top surface except for the pumping actuator 5.

Figure 5:
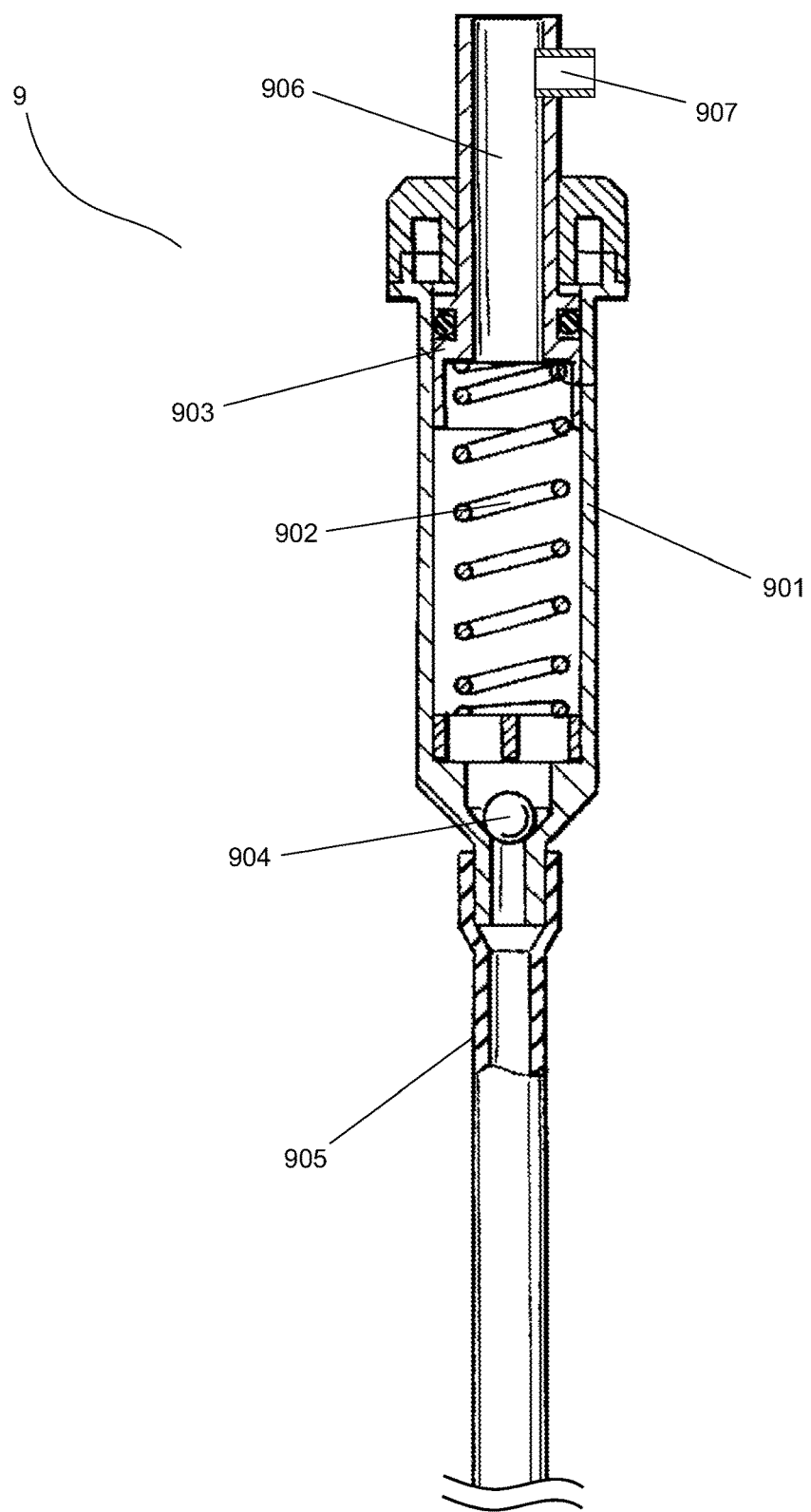
FIG. 5 is a cross-sectional view of the dispensing mechanism of the fluid dispenser shown in FIG. 1 cut along the line A-A.
Figure 6:
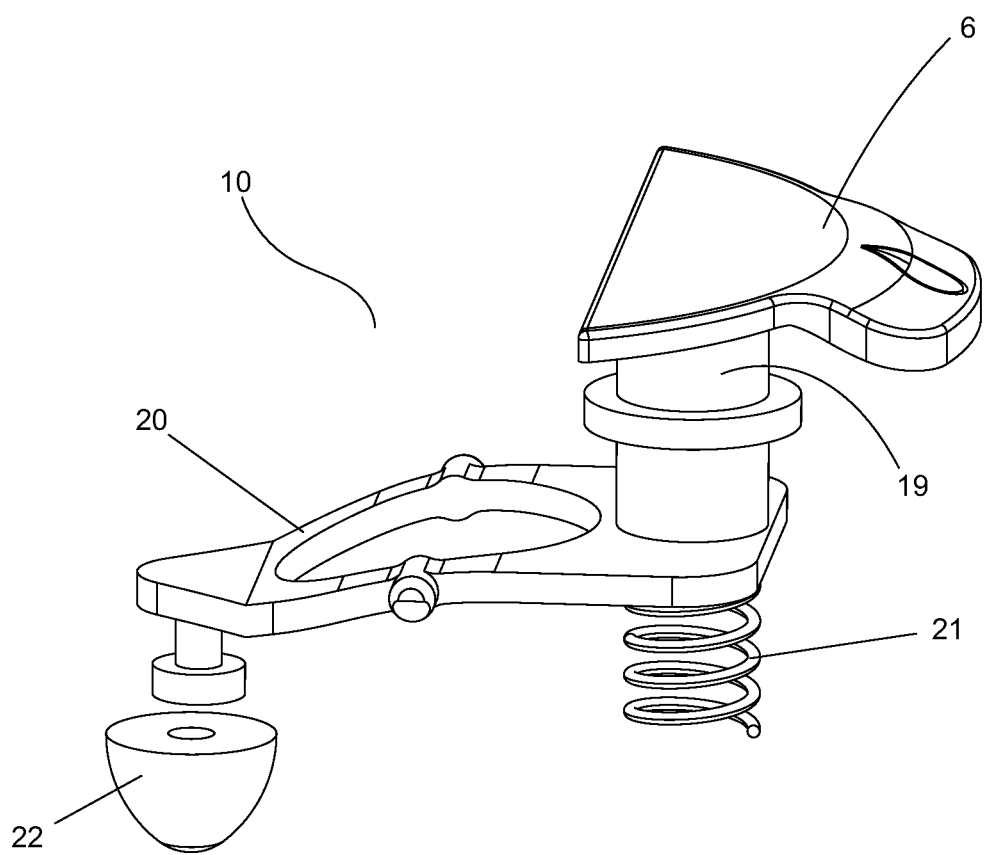
FIG. 6 is a perspective view of the reflux mechanism of the fluid dispenser shown in FIG. 1.
Figure 7:
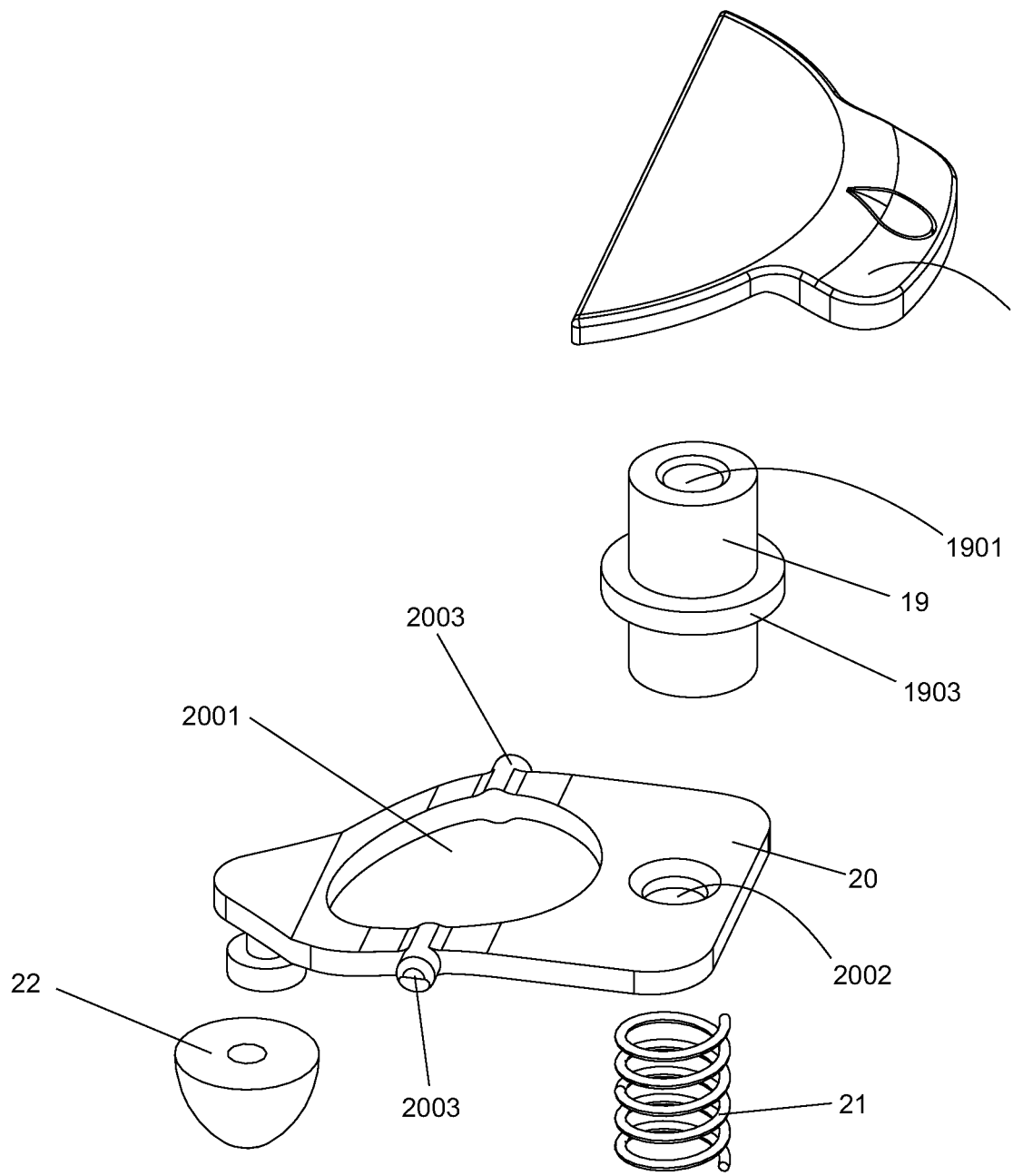
FIG. 7 is an exploded top perspective view of the reflux mechanism of the fluid dispenser shown in FIG. 1.
Figure 8:
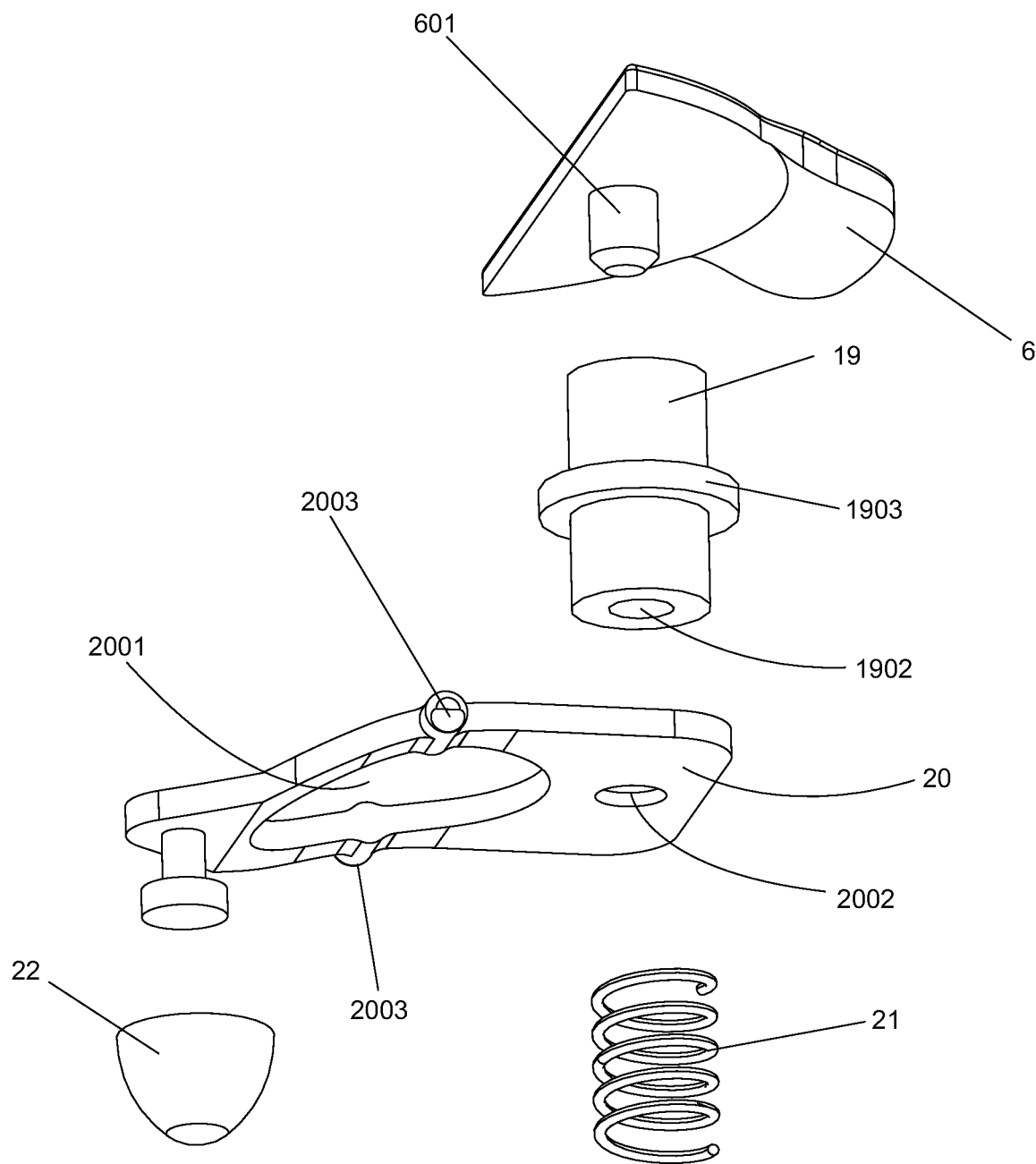
FIG. 8 is an exploded bottom perspective view of the reflux mechanism of the fluid dispenser shown in FIG. 1.
Figure 9:
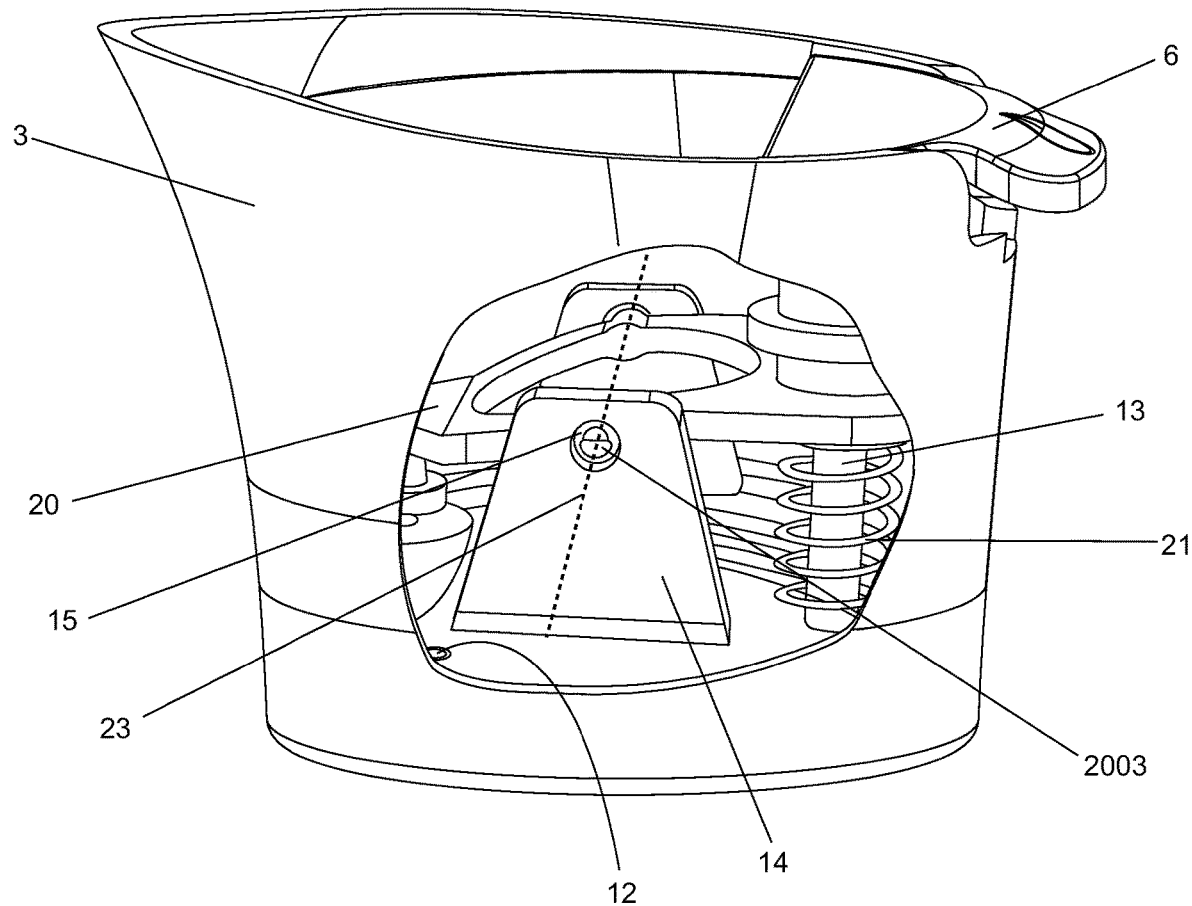
FIG. 9 is a perspective view of the reflux mechanism mounted in the metering compartment of the fluid dispenser shown in FIG. 1, with the wall of the metering compartment partially removed.

As illustrated in FIG. 5, the dispensing mechanism 9 comprises primarily a housing 901 which encloses a pumping spring 902, and a plunger 903, a lower portion of which is slidably accommodated in the housing 901. The pumping spring 902 rests on a bottom of the housing 901 and constantly applies an upward pressure on the plunger 903. An aspirating tube 905 is attached to the bottom of the housing 901 and extends down into the storing compartment 2. At the bottom of the housing 901 and below the level of the bottom of the pumping spring 902 is a check valve 904, which allows fluid to flow from the storing compartment 2 through the aspirating tube 905 into the housing 901, but not the other way around. A discharge passage 906 is formed in the plunger 903, extending from a bottom thereof to a discharge hole 907 proximate to a top of the plunger 903. The bottom portion of the plunger 903 is configured to form a sealing contact with an inner wall of the housing 901, such that when the plunger 903 is forced to move downwardly (for example, when the pumping actuator 5 is pressed downwardly by the user), the fluid in the housing 901 is forced to flow through the discharge passage 906 out of the discharge hole 907 and into the metering compartment 3. When the downward pressure on the plunger 903 is released, the plunger 903 is biased by the pumping spring 902 to move upwardly, causing fluid in the storing compartment 2 to flow through the aspirating tube 905 and the check valve 904 into the housing 901. When the plunger 903 is pressed down again, the fluid in the housing 901 will again be dispensed into the metering compartment 3. In this manner, the fluid contained in the storing compartment 2 can be pumped into the metering compartment 3 by pressing the pumping actuator 5.

As shown in FIGS. 6-9, the reflux mechanism 10 comprises the reflux actuator 6, the linkage 19, a lever member 20, a first spring 21 and a blocking member 22. The lever member 20 has a center hole 2001 for the dispensing mechanism 9 to extend through, and a side hole 2002 for the post 13 to extend through, in such a manner that the lever member 20 is movable relative to the post 13. In addition, the lever member 20 further comprises a pair of mounting pins 2003 formed on opposite sides of the center hole 2001 and extending outwardly. The pair of mounting pins 2003 are inserted into the mounting holes 15 of the mounting piers 14 of the metering compartment 3 (see FIG. 9), such that the lever member 20 is mounted on the mounting piers 14 in such a manner that the lever member 20 is pivotal relative to the mounting piers 14 about an axis 23 extending between the mounting holes 15.

The first spring 21 is held on the post 13, and is configured to constantly apply an upward pressure to a first end portion 2004 of the lever member 20 proximate to the side hole 2002. The blocking member 22 is fixedly attached to the lever member 20 at a second end portion 2005 thereof opposite to the first end portion 2004, and the position of the blocking member 22 is configured to be right above the reflux aperture 12. Therefore, via the levering effect of the lever member 20, the blocking member 22 is constantly biased downwardly to block the reflux aperture 12.

The reflux actuator 6 comprises a stub 601 formed on a bottom surface thereof, which is received in the linkage 19 through a top open end 1901 thereof. A bottom open end 1902 of the linkage 19 abuts on a top surface of the lever member 20 and is aligned with the side hole 2002, such that the post 13 extend upwardly through both the side hole 2002 and the bottom open end 1902 of the linkage 19, with a top end portion of the post 13 received in the linkage 19. The linkage 19 further comprises a second shoulder 1903 formed on an outer surface thereof. The size of the second shoulder 1903 is configured to be larger than the side orifice 18 of the top plate 7, such that the linkage 19 is prevented from moving out of the metering compartment 3 through the side orifice 18.

To allow the fluid in the metering compartment 3 to flow back into the storing compartment 2, the user presses the reflux actuator 6 downwardly, forcing the linkage 19 to move downwardly against the bias of the first spring 21. The downward movement of the linkage 19 causes the lever member 20 to pivot about the axis 23 in such a direction that the blocking member 22 is lifted from the reflux aperture 12, allowing the fluid in the metering compartment 3 to flow through the reflux aperture 12 into the storing compartment 2.

When the downward pressure applied on the reflux actuator 6 is released, the resilience of the first spring 21 causes the lever member 20 to pivot about the axis 23 in such a direction that puts the blocking member 22 back into its initial position covering and blocking the reflux aperture 12 and moves the reflux actuator 6 upwardly back to its initial position.

Figure 10:
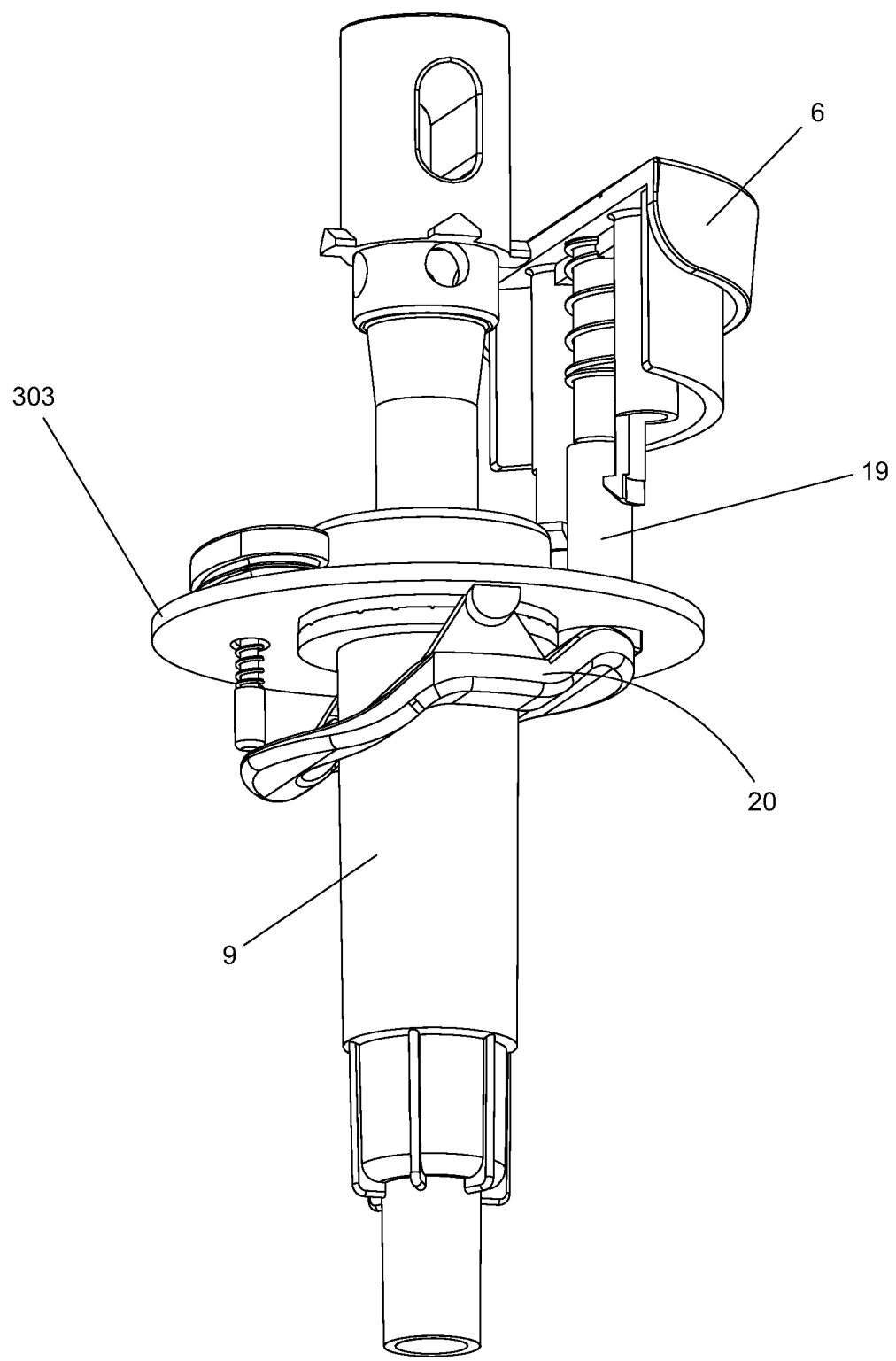
FIG. 10 is a perspective view of the reflux mechanism mounted in the metering compartment of the fluid dispenser according to a second embodiment of the present invention, with the wall of the metering compartment removed.

A second embodiment of the present invention is shown in FIGS. 10-17. This embodiment is different from the first embodiment in the manner in which the reflux mechanism is mounted to the metering compartment. In particular, as can be seen in FIG. 10, unlike the first embodiment wherein the lever member 20 of the reflux mechanism 10 is mounted above the bottom plate 303 of the metering compartment 3, in the second embodiment, the lever member 20 is mounted below the bottom plate 303 of the metering compartment 3.

Figure 11:
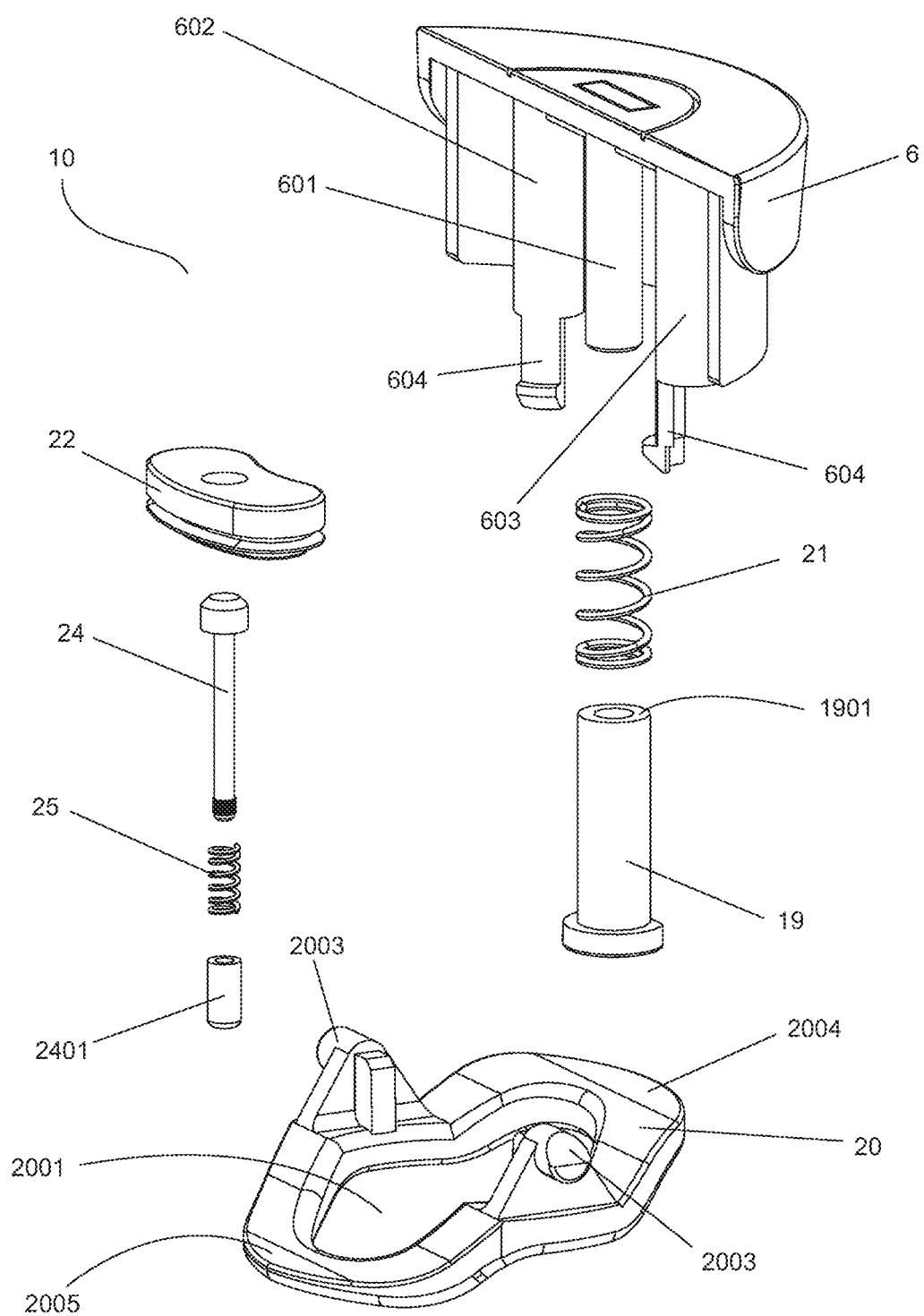
FIG. 11 is an exploded perspective view of the reflux mechanism of the fluid dispenser according to the second embodiment of the present invention.

As shown in FIG. 11, similar to the first embodiment, the reflux mechanism 10 of the second embodiment comprises a reflux actuator 6, a linkage 19, a lever member 20, a first spring 21 and a blocking member 22. The lever member 20 also has a center hole 2001 for the dispensing mechanism 9 to extend through, as well as a pair of mounting pins 2003 formed on opposite sides of the center hole 2001 and extending outwardly. However, unlike the first embodiment wherein the pair of mounting pins 2003 are inserted into the mounting holes 15 of the mounting piers 14 of the metering compartment 3, in the second embodiment, the pair of mounting pins 2003 are pivotally inserted into a pair of U-shaped mounting members 26 formed on an inner wall of the metering compartment 3 below the bottom plate 303 on opposite sides of the pumping aperture 11 (see FIGS. 12 and 13), such that the lever member 20 is mounted below the bottom plate 303 of the metering compartment in such a manner that the lever member 20 is pivotal about an axis 27 extending between the U-shaped mounting members 26.

As the lever member 20 is arranged below the bottom plate 303 instead of above the bottom plate 303, correspondingly, the reflux mechanism 10 of the second embodiment further comprises a linking pin 24 which is fixedly connected to the blocking member 22, and which movably extends through the reflux aperture 12.

Figure 12:
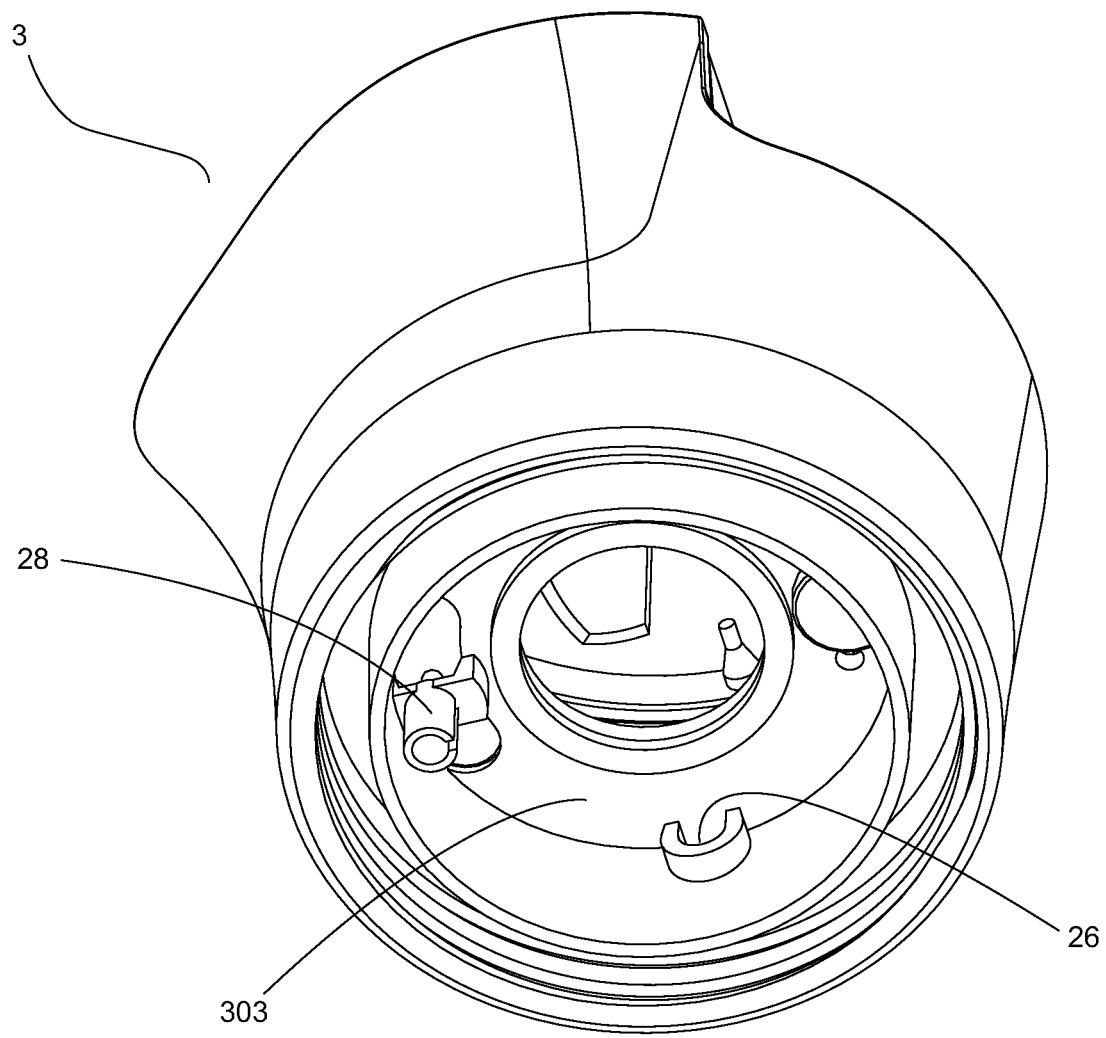
FIG. 12 is a bottom perspective view of the metering compartment of the fluid dispenser according to the second embodiment of the present invention.
Figure 13:
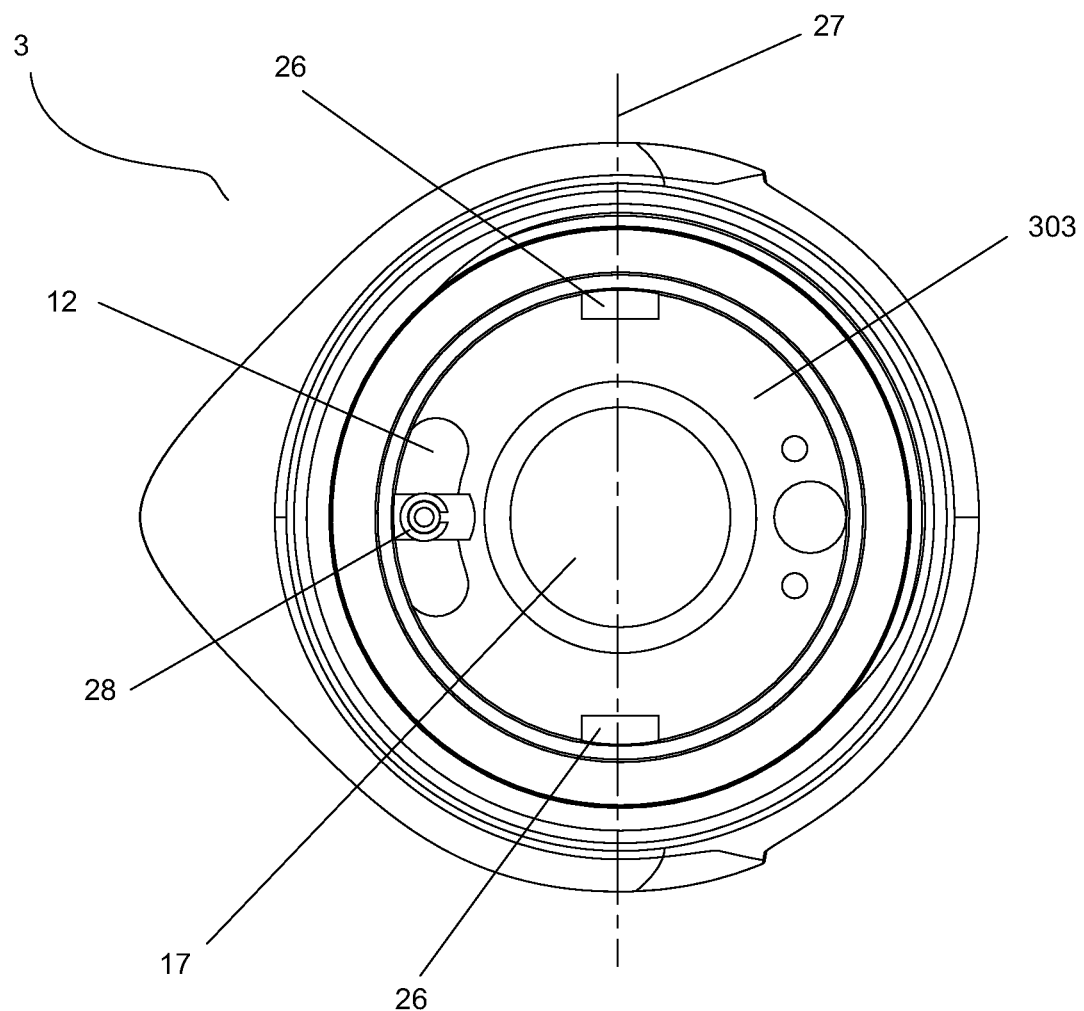
FIG. 13 is a bottom view of the metering compartment shown in FIG. 12.

As shown in FIGS. 12 and 13, a mounting sleeve 28, which allows the linking pin 24 to movably extend through, is provided below the reflux aperture 12, and is fixedly attached to a lower surface of the bottom plate 303 of the metering compartment 3. As can be seen in FIGS. 10 and 11, the linking pin 24 has a widened lower end portion 2401 which abuts the second end portion 2005 of the lever member 20. A second spring 25 is arranged in the mounting sleeve 28 and around the linking pin 24, and is configured to constantly apply a downward pressure to the widened lower end portion 2401 of the linking pin 24. Similar to the first embodiment, the blocking member 22 is located right above the reflux aperture 12. Therefore, as the blocking member 22 is fixedly connected to the linking pin 24, the blocking member 22 is constantly biased downwardly to block the reflux aperture 12.

Figure 14:
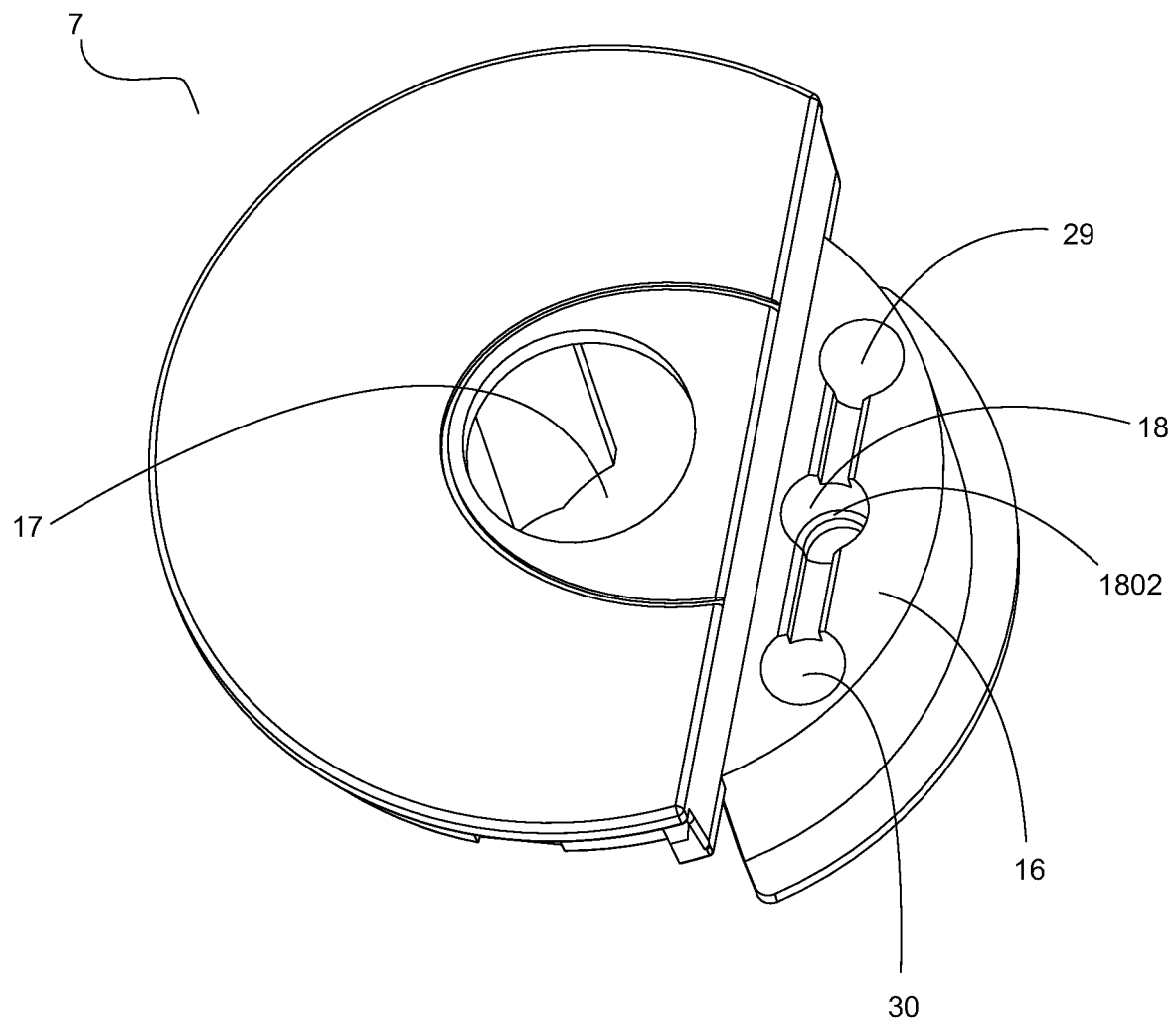
FIG. 14 is a top perspective view of the top plate of the fluid dispenser according to the second embodiment of the present invention.

As shown in FIG. 14, similar to the first embodiment, the top plate 7 is substantially of a round shape, with a step 16 formed thereon at a side opposite to the pouring outlet 8. A center orifice 17 is formed at a center of the top plate 7 for the pumping actuator 5 to movably extend through. A first side orifice 18 is formed on the step 16 for a first stub 601 formed on a bottom surface of the reflux actuator 6 to movably extend through to press against the linkage 19. As can be seen in FIG. 14, a first shoulder 1802 is formed within the first sleeve 1801 to support the first spring 21. The first spring 21 is at least partially accommodated in the first sleeve 1801 and held on the first stub 601. In other words, the first spring 21 is compressed between the shoulder 1801 and the bottom surface of the reflux actuator 6, such that an upward pressure is constantly applied to the reflux actuator 6.

As can be seen in FIG. 11, the reflux actuator 6 comprises a first stub 601 formed on a bottom surface thereof, which extends downwardly through the first sleeve 1801 and abuts a top end 1901 of the linkage 19. A bottom end 1902 of the linkage 19 abuts on a top surface of the lever member 20 in the first end portion 2004 thereof.

Figure 15:
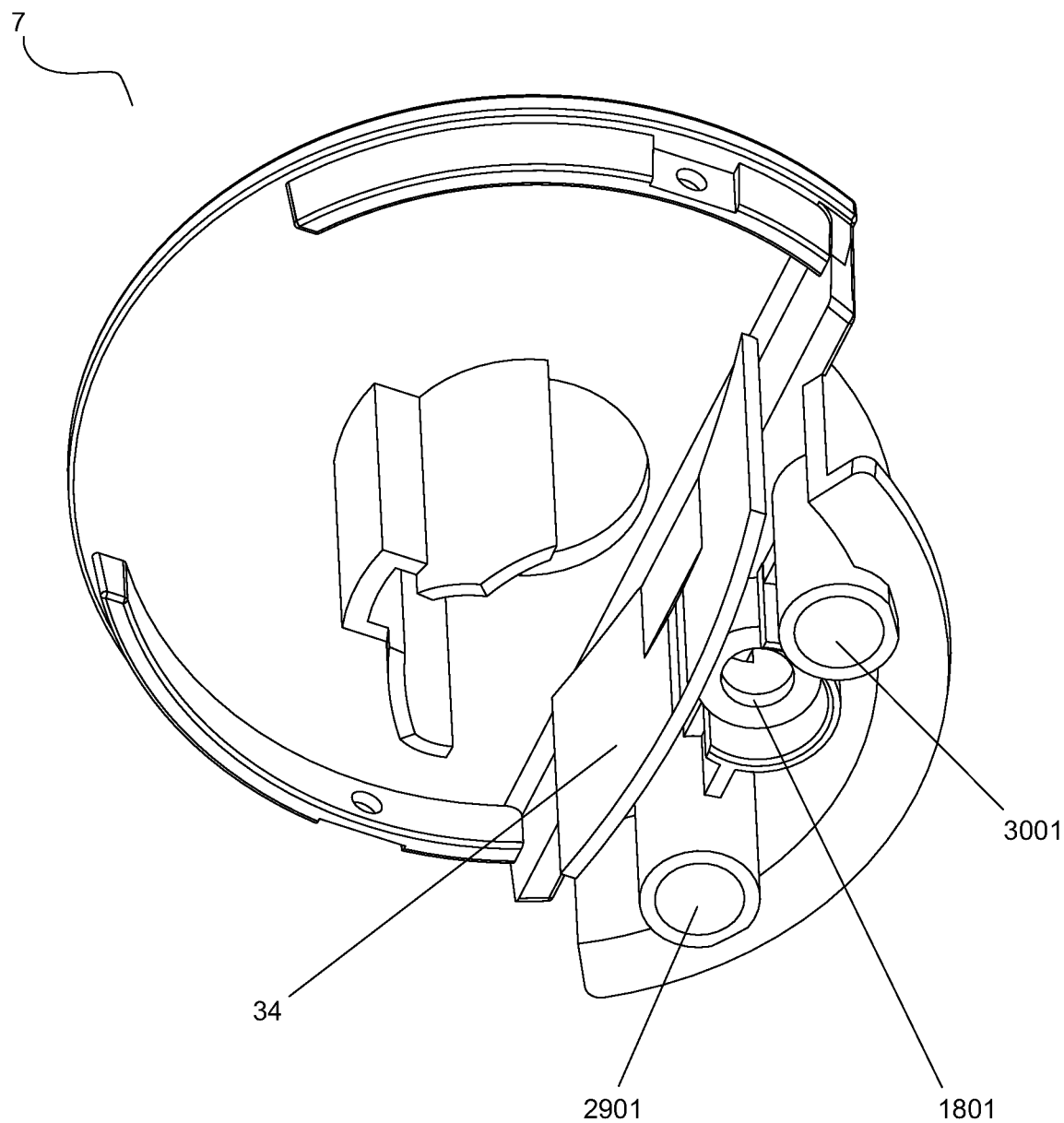
FIG. 15 is a bottom perspective view of the top plate shown in FIG. 14.
Figure 16:
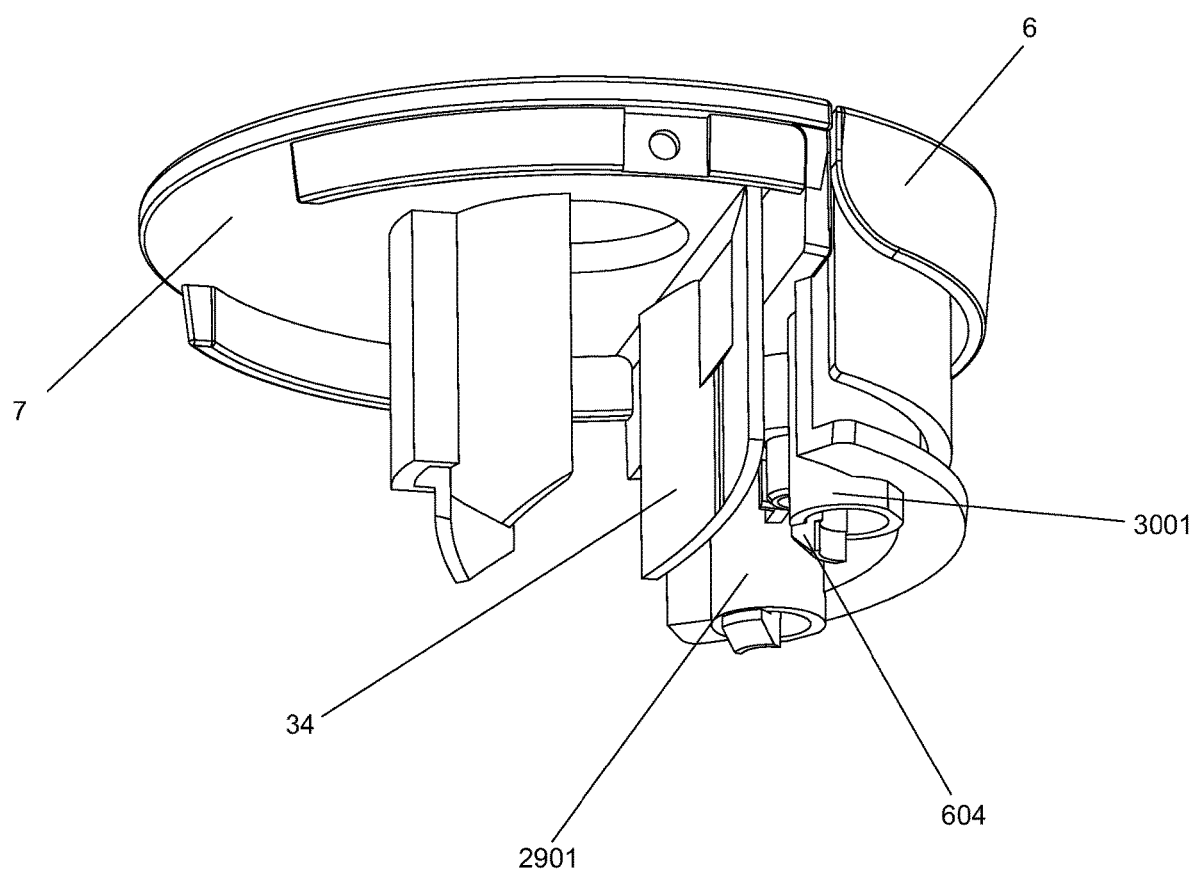
FIG. 16 is a bottom perspective view of the top plate and the reflux actuator of the fluid dispenser according to the second embodiment of the present invention.

As shown in FIGS. 14-16, a second side orifice 29 and a third side orifice 30 are formed in the step 16 of the top plate 7 on opposite sides of the first side orifice 18, and a second sleeve 2901 and a third sleeve 3001 are formed extending downwardly from the second side orifice 29 and the third side orifice 30, respectively. A second stub 602 and a third stub 603 extend from the bottom surface of the reflux actuator 6 on two opposite sides of the first stub 601. The second stub 602 and third stub 603 extend through the second sleeve 2901 and the third sleeve 3001, respectively, in order to guide the vertical movements of the reflux actuator 6. A hook portion 604 extends from each of the second stub 602 and the third stub 603, and engages with lower ends of the second sleeve 2901 and the third sleeve 3001, respectively (see FIG. 15), in order to prevent the reflux actuator 6 from being detached from the top plate 7.

Figure 17:
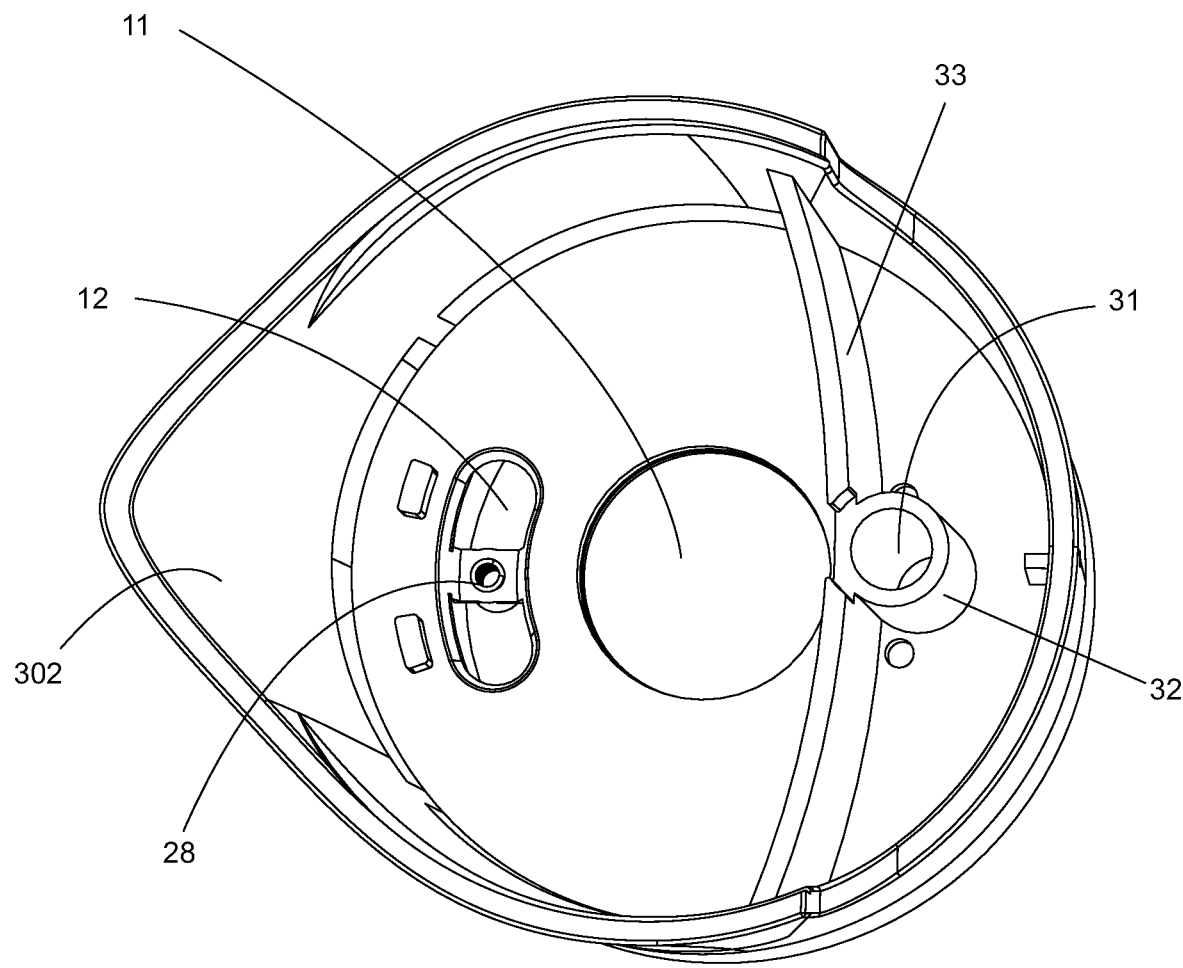
FIG. 17 is a top perspective view of the metering compartment shown in FIG. 12.

As shown in FIG. 17, the metering compartment 3 comprises an additional throughhole 31 formed on the bottom plate 303 to allow the linkage 19 to movably extend through. A fourth sleeve 32 is formed extending upwardly from the throughhole 31 to guide the vertical movement of the linkage 19, in order to ensure the stable structure and smooth operation of the reflux mechanism. In addition, in order to prevent fluid from flowing from the metering compartment 3 through the throughhole 31 into the storing compartment 2, a first separator 33 is provided extending upwardly from the bottom plate 303 of the metering compartment 3, and a second separator 34 is formed extending downwardly from the bottom surface of the top plate 7 (see FIGS. 15 and 16).

According to the second embodiment of the present invention, to allow the fluid in the metering compartment 3 to flow back into the storing compartment 2, the user presses the reflux actuator 6 downwardly against the bias of the first spring 21, with the lower end of the first projection 601 pressing downwardly on the top of the linkage 19, causing the linkage 19 to move downwardly. The downward movement of the linkage 19 causes the lever member 20 to pivot about the axis 27 in such a direction that the second end portion 2005 thereof moves upwardly. The upward movement of the second end portion 2005 in turn pushes the linking pin 24 to move upwardly against the bias of the second spring 25, resulting in the blocking member 22 being lifted from the reflux aperture 12, thus allowing the fluid in the metering compartment 3 to flow through the reflux aperture 12 into the storing compartment 2.

When the downward pressure applied on the reflux actuator 6 is released, the resilience of the first spring 21 causes the reflux actuator 6 to move upwardly back to its initial position, and the resilience of the second spring 25 causes the linking pin 24 to move downwardly, putting the blocking member 22 back into its initial position covering and blocking the reflux aperture 12.

Through the combination of the pumping function provided by the dispensing mechanism 9 (which increases the amount of fluid in the metering compartment 3) and the reflux function provided by the reflux mechanism 10 (which reduces the amount of fluid in the metering compartment 3), the fluid dispenser of the present invention provides a simple and convenient way to accurately meter a certain amount of fluid into the metering compartment. The metered fluid can then be poured out of the metering compartment for use such as cooking food, thus avoiding waste.

While the present invention is described in connection with what are presently considered to be the most practical and preferred embodiments, it should be appreciated that the invention is not limited to the disclosed embodiments, and is intended to cover various modifications and equivalent arrangements included within the scope of the claims. Modifications and variations in the present invention may be made without departing from the novel aspects of the invention as defined in the claims, and this application is limited only by the scope of the claims.

NUMERICAL REFERENCES 1 fluid dispenser
2 storing compartment
3 metering compartment
5 pumping actuator
6 reflux actuator
7 top plate
8 pouring outlet
9 dispensing mechanism
10 reflux mechanism
11 window
12 reflux aperture
13 post
14 mounting pier
15 mounting hole
16 step
17 center orifice
18 first side orifice
19 linkage
20 lever member
21 spring
22 blocking member
23 axis
24 linking pin
25 second spring
26 U-shaped mounting member
27 axis
28 mounting sleeve
29 second side orifice
30 third side orifice
31 throughhole
32 fourth sleeve
33 first separator
34 second separator
201 top opening
301 top opening
302 pouring trough
303 bottom plate
601 first projection
602 second projection
603 third projection
604 hook portion
901 housing
902 pumping spring
903 plunger
904 check valve
905 aspirating tube
906 discharge passage
907 discharge hole
1801 first sleeve
1802 shoulder
1901 top end
1902 bottom end
1903 shoulder
2001 center hole
2002 side hole
2003 mounting pin
2004 first end portion
2005 second end portion
2401 widened lower end portion
2901 second sleeve
3001 third sleeve

What is claimed is:

1. A fluid dispenser (1) for containing fluid and dispensing a metered amount of the fluid, comprising:
   a storing compartment (2) for storing the fluid and having a top opening (201),
   a metering compartment (3) placed over and covering the top opening (201) of the storing compartment (2),
   a dispensing mechanism (9) extending into the storing compartment (2) and able to draw an amount of the fluid from the storing compartment (2) and discharge the amount of the fluid into the metering compartment (3), and
   a reflux mechanism (10) which, when actuated, allows the fluid discharged into the metering compartment (3) to flow back into the storing compartment (2);
   wherein the reflux mechanism (10) comprises:
      a blocking member (22) adapted for operably blocking a reflux aperture (12),
      a lever member (20) pivotally mounted on the metering compartment (3) to cause the blocking member (22) to block or expose the reflux aperture (12), and
      a reflux actuator (6) in operative connection with lever member (20) for actuating pivotal movement of the lever member (20).

2. The fluid dispenser (1) of claim 1, wherein the dispensing mechanism (9) is a pumping mechanism configured as a push-actuated pump extending through a bottom plate (303) of the metering compartment (3) to pump the fluid from the storing compartment (2) into the metering compartment (3) when pressed downwardly.

3. The fluid dispenser (1) of claim 2, wherein the dispensing mechanism (9) comprises:
   a housing (901),
   a plunger (903) having a lower portion movable within the housing (901) to draw and discharge the fluid, an upper portion extending beyond a top of the housing (901), and a discharge passage (906) formed therein for discharging the fluid from the housing (901) into the metering compartment (3),
   a pumping spring (902) accommodated in the housing (901) and configured to constantly apply an upward force to the plunger (903),
   a one-way valve (904) arranged at a bottom of the housing (901) and configured to allow for only upward flow of the fluid therethrough into the housing (901).

4. The fluid dispenser (1) of claim 3, further comprising a pumping actuator (5) coupled with the upper portion of the plunger (903) and movable to move the plunger (903) within the housing (901).

5. The fluid dispenser (1) of claim 3, wherein the dispensing mechanism (9) further comprises an aspirating tube (905) connected to the one-way valve (904) and in fluid communication with the storing compartment (2).

6. The fluid dispenser (1) of claim 3, wherein the plunger (903) is arranged such that the lower portion of the plunger (903) forms a sealing contact with an inner wall of the housing (901).

7. The fluid dispenser (1) of claim 1, wherein a window (11) for the dispensing mechanism (9) to extend therethrough and a reflux aperture (12) are formed through a bottom plate (303) of the metering compartment (3), wherein the reflux aperture (12) is operably blocked by the reflux mechanism (10) when the reflux mechanism (10) is not activated, and is exposed to allow the fluid to return from the metering compartment (3) into the storing compartment (2) when the reflux mechanism (10) is actuated.

8. The fluid dispenser (1) of claim 1, wherein the reflux mechanism (10) further comprises a linkage (19) arranged between the reflux actuator (6) and a first end portion (2004) of the lever member (20) for transmitting downward movement of the reflux actuator (6) to the first end portion (2004) of the lever member (20), and the lever member (20) has a second end portion (2005) opposite to the first end portion (2004) coupled with the blocking member (22), wherein the reflux actuator (6) is actuated to move the second end portion (2005) upwardly to lift the blocking member (22) from the reflux aperture (12).

9. The fluid dispenser (1) of claim 8, wherein the metering compartment (3) comprises a top plate (7) having a center orifice (17) for the pumping actuator (5) to movably extend through, and having a first side orifice (18) for a first stub (601) extending downwardly from a bottom surface of the reflux actuator (6) to movably extend therethrough to press against the linkage (19).

10. The fluid dispenser (1) of claim 1, wherein the lever member (20) comprises a center hole (2001) formed therethrough for the dispensing mechanism (9) to extend through, and a pair of mounting pins (2003) extending outwardly from opposite sides of the center hole (2001) for pivotally mounting the lever member (20) to the metering compartment (3).

11. The fluid dispenser (1) of claim 10, wherein a pair of mounting piers (14) extend upwardly from the bottom plate (303) of the metering compartment (3) on opposite sides of a window (11), each of the mounting piers (14) having a mounting hole (15) formed therein, and the pair of mounting pins (2003) of the lever member (20) are pivotally inserted into the pair of mounting holes (15), respectively, such that the lever member (20) is pivotally mounted on the pair of mounting piers (14).

12. The fluid dispenser (1) of claim 11, wherein the blocking member (22) is fixedly connected to the second end portion (2005) of the lever member (20) and is positioned right above the reflux aperture (12).

13. The fluid dispenser (1) of claim 11, wherein a post (13) extends upwardly from the bottom plate (303) of the metering compartment (3) through a side hole (2002) formed in the first end portion (2004) of the lever member (20), and a first spring (21) is held on the post (13) between the bottom plate (303) of the metering compartment (3) and the lever member (20), and is configured to constantly apply an upward force to the first end portion (2004) of the lever member (20).

14. The fluid dispenser (1) of claim 13, wherein the linkage (19) has a top open end (1901) for receiving a stub (601) extending downwardly from a bottom surface of the reflux actuator (6), and a bottom open end (1902) for receiving a top end portion of the post (13) which extends beyond the lever member (20) through the side hole (2002).

15. The fluid dispenser (1) of claim 10, wherein a pair of U-shaped mounting members (26) are formed on an inner wall of the metering compartment (3) below the bottom plate (303) and positioned to correspond to the pair of mounting pins (2003) of the lever member (20) for pivotal insertion of the pair of mounting pins (2003) into the pair of U-shaped mounting members (26), respectively.

16. The fluid dispenser (1) of claim 15, wherein a first sleeve (1801) extends downwardly from the first side orifice (18), and a shoulder (1802) is formed within the first sleeve (1801), wherein a first spring (21) is held on the first stub (601) received in the first sleeve (1801) and between the shoulder (1802) and the bottom surface of the reflux actuator (6) to constantly apply an upward force to the reflux actuator (6).

17. The fluid dispenser (1) of claim 15, wherein a second side orifice (29) and a third side orifice (30) are formed in the top plate (7) on opposite sides of the first side orifice (18), and a second sleeve (2901) and a third sleeve (3001) extend downwardly from the second side orifice (29) and the third side orifice (30), respectively, to movably receive a second stub (602) and a third stub (603) extending downwardly from the bottom surface of the reflux actuator (6), respectively.

18. The fluid dispenser (1) of claim 17, wherein a hook portion (604) is formed at a lower end of each of the second stub (602) and the third stub (603), and engages with lower ends of the second sleeve (2901) and the third sleeve (3001), respectively, to prevent the reflux actuator (6) from being detached from the top plate (7).

19. The fluid dispenser (1) of claim 15, wherein the reflux mechanism (10) further comprises a linking pin (24) which is fixedly connected to the blocking member (22), and which movably extends through the reflux aperture (12), such that the reflux mechanism (10) is actuated to cause the pivotal movement of the lever member (20) to move the blocking member (22) which in turns drives to block or expose the reflux aperture (12).

20. The fluid dispenser (1) of claim 19, wherein a mounting sleeve (28) is aligned with the reflux aperture (12) and is fixedly attached to a lower surface of the bottom plate (303) of the metering compartment (3), and wherein the linking pin (24) on which the second spring (25) is held is movable within the mounting sleeve (28), thereby to constantly apply a downward force to an enlarged-diameter lower end portion (2401) of the linking pin (24), such that when the reflux mechanism (10) is not actuated, the blocking member (22) is biased to cover and block the reflux aperture (12).

21. The fluid dispenser (1) of claim 15, wherein a throughhole (31) is formed through the bottom plate (303) to allow the linkage (19) to movably extend through.

22. The fluid dispenser (1) of claim 21, wherein a fourth sleeve (32) extends upwardly from the throughhole (31) to guide the vertical movement of the linkage (19).

23. The fluid dispenser (1) of claim 22, wherein a first separator (33) extends upwardly from the bottom plate (303) of the metering compartment (3), and a second separator (34) extends downwardly from the bottom surface of the top plate (7) to prevent fluid from flowing from the metering compartment (3) through the throughhole (31) into the storing compartment (2).

\* \* \* \* \*